Patented Nov. 24, 1936

2,062,205

UNITED STATES PATENT OFFICE 2,062,205

PROCESS OF PRODUCING THE M-ALKYL-ETHERS OF PROTOCATECHUIC ALDEHYDE

Friedrich Boedecker, Dahlem, near Berlin, and Hans Volk, Tempelhof, near Berlin, Germany No Drawing. Application April 1, 1936, Serial No. 72,208. In Germany March 21, 1932

13 Claims. (Cl. 260—137)

The present invention is a continuation in part of our application Serial No. 660,766, filed March 14, 1933. In this application we have claimed in the manufacture of m-alkyl-ethers of protocatechuic aldehyde, the steps which comprise reacting an o-alkoxy-phenol with a readily soluble salt of glyoxylic acid, in alkaline solution, and subsequently treating the product so obtained with a mild oxidation agent. We have found that glyoxylic acid, COH—CO$_2$H, under certain conditions enables addition of an aldehyde group to aromatic compounds and this discovery is utilized in the present invention in producing vanillin and like compounds from certain alkoxyphenols.

The present invention relates also to the manufacture of the m-alkyl-ethers of protocatechuic aldehyde, having the formula

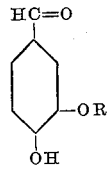

wherein R is the said alkyl group.

In investigating the manufacture of the said m-alkyl-ethers, we have found by experiment, that when readily soluble salts of glyoxylic acid are allowed to act on an o-alkoxy-phenol, in alkaline solution, there are obtained solutions of reaction products from which the m-alkyl-ethers of protocatechuic aldehyde may be produced, by treating them with mild oxidation agents; oxidation agents such as reducible compounds of heavy metals for example copper oxide (CuO), dioxide of lead (PbO$_2$) or manganese (MnO$_2$), cobalt oxide (CO$_3$O$_4$), mercuryoxide (HgO), argenticoxide (Ag$_2$O) or aromatic nitro bodies.

We have further found that the condensation of the glyoxylic acid with the o-alkoxy-phenol takes place readily at normal temperature. The said condensation may be advantageously effected by adding the said phenol to a solution of a readily soluble salt of the glyoxylic acid, the solution having been previously made basic by adding a suitable base such as alkali, alkaline earth or an organic tertiary base, in amounts equivalent to the phenol.

It is also possible to add to a mixture of glyoxylic acid and the phenol ether so much alkali as necessary for the saturation of the glyoxylic acid and the phenol.

The mixture is then permitted to stand for some time and occasionally stirred during this period. Diluted solutions of glyoxylic acid, such as those obtained by the electrolytic reduction of oxalic acid, may be advantageously used for the said condensation.

The solutions obtained by the said condensation reaction are subsequently treated with the above mentioned oxidation agents, preferably in an alkaline medium. In this operation, it is not necessary to remove the said condensation products from the solutions, prior to the treatment with the said oxidation agents to effect the said oxidation.

The following examples are an illustrative embodiment of our processes wherein a solution of glyoxylic acid is first prepared and rendered basic by the addition of a suitable base, this solution reacted with an alkoxy-phenol and then the product so obtained, while still in solution, is oxidized with one of the said oxidation agents.

Example 1

10 g. of glyoxylic acid are neutralized in an aqueous solution with caustic soda solution. 30 g. of pyrocatechin-mono-sec. butyl ether and 25 g. of caustic soda solution (30%) are added and the mixture is stirred until the solid substances have dissolved. The solution is left to itself for some days and is thereupon acidified slightly, whereupon unchanged pyrocatechin-butyl ether is extracted with benzol. The solution is now made alkaline and 55 g. of sulphate of copper (crystallized) and caustic soda solution are added. This mixture is then stirred for about 3 hours at 90–100° C. The fluid is thereupon sucked off from the copper sludge and the filtrate is extracted with ether. The residue will when distilled in vacuum (14 mm.) at 164–168° C. pass over in the form of a rapidly solidifying yellowish oil. After recrystallization from hexahydrotoluol a product is obtained which consists of the m-sec. butyl ether of protocatechuic aldehyde. Melting point: 45–46° C.

Example 2

30 g. of glyoxylic acid are neutralized in aqueous solution with caustic soda solution, whereupon 83 g. of o-ethoxy-phenol and 82 g. of caustic soda solution (30%) are added and the mixture is left to itself for some days at room temperature. Thereupon the mixture is acidified until slight methylorange-acid reaction and the o-ethoxy-phenol which did not partake in the reaction is removed by shaking with benzol. After the solution has been freed from o-ethoxy-phenol, caustic soda solution and 140 g. of lead peroxide (lead dioxide) are added and the mixture is stirred for some time at 90–100° C. The fluid is thereupon sucked off from the lead sludge and the filtrate is acidified and extracted with benzol. The benzol extracts leave a crystalline residue which, when distilled in vacuum will distil over substantially without leaving any residue. After recrystallization from benzine-toluol the pure m-ethyl ether of protocatechuic aldehyde is obtained. Melting point: 77–78° C.

*Example 3*

A condensation lye of guaiacol with glyoxylic acid is produced in the manner disclosed in Example 1 and 550 ccm. of this lye is subjected to a treatment the first step of which consists in removing the surplus of guaiacol. To this lye an alkaline solution of 20 g. of nitrophenol-sulphonic-acid sodium in water is added and the mixture is boiled for some hours on a reflux cooler. The product is acidified and extracted with benzol. The benzol extracts leave a good yield of vanilline, which can be purified by distillation or recrystallization.

*Example 4*

A solution of glyoxylic acid, produced from 15 grams of oxalic acid, in known way by electrolytic reaction, is neutralized with caustic soda solution and a concentrated solution of 10 grams of guaiacol, in the calculated amount of caustic soda solution, is added. The product is left to itself for some hours at normal room temperature and is thereupon acidified with acetic acid. The part of the guaiacol which did not partake in the reaction is blown off with steam, whereby 3.2 grams of guaiacol are recovered. The residue from the distillation is now again made slightly alkaline, 25 grams of pulverized sulphate of copper and 70 ccm. of soda lye (15 per cent) are added and the mixture is heated for some hours under stirring to 90–100° C. The product is sucked off from the copper sludge and the filtrate is acidified and extracted with benzol. After the evaporation of the benzol solution 8 grams of vanillin are left, which at the subsequent distillation in vacuum (4–5 mm.), will pass over at 135–140° C. almost without leaving any residue. The distillate will solidify to a crystalline mass and this mass is recrystallized from toluol, of which 2.5 as large a quantity is used, whereby pure vanillin (81° F.) is obtained.

According to the same principle it is possible to convert other phenols for example phenol, cresol, naphthol, and so on in oxyaldehydes.

We claim:

1. In the manufacture of m-alkyl-ethers of protocatechuic aldehyde, the steps which comprise reacting an o-alkoxy-phenol with a readily soluble salt of glyoxylic acid, in alkaline solution, and subsequently treating the product so obtained with a mild oxidation agent.
2. The process of claim 1 wherein said o-alkoxy-phenol is o-ethoxy-phenol and the m-alkyl-ether of protocatechuic aldehyde so obtained is m-ethyl-ether of protocatechuic aldehyde.
3. The process of claim 1 wherein said salt of glyoxylic acid is sodium glyoxylate.
4. The process of claim 1 wherein said o-alkoxy-phenol is o-ethoxy-phenol and said salt of glyoxylic acid is sodium glyoxylate.
5. The process of claim 1 wherein said mild oxidation agent is a reducible compound of a heavy metal.
6. The process of claim 1 wherein said mild oxidation agent is cupric oxide.
7. The process of claim 1 wherein said mild oxidation agent is dioxide of lead.
8. The process of claim 1 wherein said mild oxidation agent is dioxide of manganese.
9. The process of claim 1 wherein said alkaline solution is a caustic soda solution.
10. The process of claim 1 wherein said alkaline solution contains sufficient alkali to react with the carboxylic acid and hydroxy groups of the glyoxylic acid and of the phenol compound.
11. The process of claim 1 wherein said o-alkoxy-phenol is guaiacol and the m-alkyl-ether of protocatechuic aldehyde so obtained is vanillin.
12. The process of claim 1 wherein said o-alkyl-phenol is guaiacol and said salt of glyoxylic acid is sodium glyoxylate.
13. The process of claim 1 wherein said o-alkyl-phenol is pyrocatechin-mono-secondary butyl ether and the m-alkyl ether of protocatechuic aldehyde so obtained is the m-secondary butyl ether of protocatechuic aldehyde.

FRIEDRICH BOEDECKER.
HANS VOLK.